United States Patent
Musikka et al.

(10) Patent No.: US 8,699,507 B2
(45) Date of Patent: Apr. 15, 2014

(54) SCHEDULING OF DATA TRANSMISSIONS IN MULTI-CARRIER DATA TRANSMISSION NETWORKS

(75) Inventors: Niilo Musikka, Bromma (SE); Babak Alamshahi, Jarfalla (SE); Rutger Andersson, Kista (SE); Samuel Axelsson, Stocksund (SE); Patrik Karlsson, Stockholm (SE); Lars O Martensson, Taby (SE); Fredrik Martensson, Alvsjo (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 398 days.

(21) Appl. No.: 12/999,817

(22) PCT Filed: Jun. 19, 2008

(86) PCT No.: PCT/EP2008/004956
§ 371 (c)(1),
(2), (4) Date: Mar. 18, 2011

(87) PCT Pub. No.: WO2009/152835
PCT Pub. Date: Dec. 23, 2009

(65) Prior Publication Data
US 2011/0158194 A1 Jun. 30, 2011

(51) Int. Cl.
*H04B 7/212* (2006.01)
(52) U.S. Cl.
USPC ........... 370/444; 370/329; 370/441; 370/443; 370/468
(58) Field of Classification Search
None
See application file for complete search history.

(56) References Cited

U.S. PATENT DOCUMENTS

| | | | |
|---|---|---|---|
| 6,668,175 B1 * | 12/2003 | Almgren et al. | 455/522 |
| 7,072,321 B2 * | 7/2006 | Holtzman et al. | 370/335 |
| 7,616,601 B2 * | 11/2009 | Norrgard et al. | 370/329 |
| 7,668,176 B2 * | 2/2010 | Chuah | 370/395.42 |
| 2002/0090004 A1 * | 7/2002 | Rinchiuso | 370/468 |
| 2004/0125768 A1 | 7/2004 | Yoon et al. | |

(Continued)

FOREIGN PATENT DOCUMENTS

WO WO 95/34149 A1 12/1995
WO WO 02/069665 A2 9/2002

OTHER PUBLICATIONS

Song et al., "Performance Analysis of Channel Assignment Methods for Multiple Carrier CDMA Cellular Systems," IEEE, 1999, pp. 10-14.

(Continued)

*Primary Examiner* — Donald Mills
(74) *Attorney, Agent, or Firm* — Myers Bigel Sibley & Sajovec, P.A.

(57) ABSTRACT

The invention relates to a scheduling of data transmissions in multi-carrier data transmission systems, e.g. multi-carrier W-CDMA systems. A method embodiment of performing one or more data transmissions in a multi-carrier data transmission network (100) comprises, in a transmitting device (102), the steps of requesting transmission resources from a resource granting device (106); receiving, in response to the request (120), one or more transmission grants (gr1-gr3) from the resource granting device (106), wherein each transmission grant (gr1) indicates a data rate (dr1) and a data class (Cl1) granted for a specific transmission carrier (Cr1); and initiating one or more transmissions (122-126) of data associated with one or more of the granted data classes on one or more of the granted transmission carriers.

19 Claims, 9 Drawing Sheets

(56) References Cited

U.S. PATENT DOCUMENTS

2005/0243744 A1* 11/2005 Tan ............................... 370/278
2006/0039312 A1* 2/2006 Walton et al. .................. 370/319
2006/0176811 A1* 8/2006 Yang et al. .................... 370/229
2008/0214197 A1* 9/2008 Englund et al. ............... 455/450

OTHER PUBLICATIONS

International Preliminary Report on Patentability for PCT/EP2008/004956 mailed Aug. 9, 2010.

* cited by examiner

| Transmission device 102 | Carrier 1 | Carrier 2 | Carrier 3 | Carrier 4 |
|---|---|---|---|---|
| Signalling (priority 1) | 4 Mbps | 0 Mbps | 0 Mbps | 0 Mbps |
| Conversational (priority 2) | 4 Mbps | 0 Mbps | 0 Mbps | 0 Mbps |
| Streaming (priority 3) | 4 Mbps | 0 Mbps | 0 Mbps | 0 Mbps |
| Interactive (priority 4) | 0 Mbps | 4 Mbps | 3 Mbps | 2 Mbps |
| Background (priority 5) | 0 Mbps | 4 Mbps | 3 Mbps | 2 Mbps |

Fig. 4a

| Transmission device 104 | Carrier 1 | Carrier 2 | Carrier 3 | Carrier 4 |
|---|---|---|---|---|
| Signalling (priority 1) | 4 Mbps | 0 Mbps | 0 Mbps | 0 Mbps |
| Conversational (priority 2) | 4 Mbps | 0 Mbps | 0 Mbps | 0 Mbps |
| Streaming (priority 3) | 4 Mbps | 0 Mbps | 0 Mbps | 0 Mbps |
| Interactive (priority 4) | 0 Mbps | 2 Mbps | 3 Mbps | 4 Mbps |
| Background (priority 5) | 0 Mbps | 2 Mbps | 3 Mbps | 4 Mbps |

|  | Grants on Carrier 1 | Grants on Carrier 2 | Grants on Carrier 3 | Grants on Carrier 4 |
|---|---|---|---|---|
| Transmitting device 1 | 4 Mbps | 3 Mbps | 2 Mbps | 1 Mbps |
| Transmitting device 2 | 1 Mbps | 4 Mbps | 3 Mbps | 2 Mbps |
| Transmitting device 3 | 2 Mbps | 1 Mbps | 4 Mbps | 3 Mbps |
| Transmitting device 4 | 3 Mbps | 2 Mbps | 1 Mbps | 4 Mbps |

Fig. 7

|  | Grants on Carrier 1 | Grants on Carrier 2 | Grants on Carrier 3 | Grants on Carrier 4 |
|---|---|---|---|---|
| Transmitting device 1 | 1 Mbps | Alternating 0 and 4 Mbps | Alternating 0 and 4 Mbps | Alternating 0 and 4 Mbps |
| Transmitting device 2 | 1 Mbps | Alternating 0 and 4 Mbps | Alternating 0 and 4 Mbps | Alternating 0 and 4 Mbps |
| Transmitting device 3 | 1 Mbps | Alternating 0 and 4 Mbps | Alternating 0 and 4 Mbps | Alternating 0 and 4 Mbps |
| Transmitting device 4 | 1 Mbps | Alternating 0 and 4 Mbps | Alternating 0 and 4 Mbps | Alternating 0 and 4 Mbps |

Fig. 8

SCHEDULING OF DATA TRANSMISSIONS IN MULTI-CARRIER DATA TRANSMISSION NETWORKS

CROSS REFERENCE TO RELATED APPLICATION

This application is a 35 U.S.C. §371 national stage application of PCT International Application No. PCT/EP2008/004956, filed on 19 Jun. 2008, the disclosure and content of which is incorporated by reference herein in its entirety. The above-referenced PCT International Application was published in the English language as International Publication No. WO 2009/152835 A8 on 23 Dec. 2009.

TECHNICAL FIELD

The invention relates to the scheduling of data transmissions in multi-carrier data transmission systems, for example multi-carrier W-CDMA systems. More particularly, the invention relates to the scheduling of data transmissions on multiple uplink carriers in mobile terminals connecting to a multi-carrier W-CDMA mobile network.

BACKGROUND

In many conventional mobile networks, a mobile terminal is assigned a dedicated channel for its uplink (and downlink) data transmissions. For example, in a pure FDMA (Frequency Division Multiple Access) system, the terminal is assigned a dedicated frequency channel and in a pure TDMA (Time Division Multiple Access) systems, the terminal is assigned a dedicated time slot. In CDMA (Code Division Multiple Access) networks, there is no dedicated channel, but one transmission carrier frequency (often shortly referred to as 'carrier' hereinafter) is provided which serves multiple terminals, i.e. each of multiple mobile terminals transmits data on one and the same carrier. CDMA systems up to W (Wideband)-CDMA networks of 3GPP ($3^{rd}$ Generation Partnership Project) release are based on the single-carrier approach. However, the next generation of CDMA networks will be multi-carrier networks in which a mobile terminal may transmit (and receive) data on several carrier frequencies in parallel. In other words, in such multi-carrier-networks there may be several mobile terminals per carrier and several carriers per mobile terminal.

In a single-carrier CDMA system, the network controls the transmissions of a terminal in downlink and in uplink direction. With regard to the control of uplink transmissions, the network issues access grants indicating a particular (maximum) data rate, which the mobile terminal may use on the uplink carrier. The network determines the grant based on data transmission requests from the terminals and an interference between the ongoing transmissions on the uplink carrier. For example, the so-called "happy bit" approach comprises setting a 1-bit flag in uplink control messages indicating to the network whether or not the terminal is happy with the current grant. A terminal will request a higher data rate in case the current data in its transmission buffer cannot be emptied (within a predetermined time) with the currently granted data rate. Basically, in a single-carrier CDMA system, the interference headroom is shared between the multiple terminals transmitting in parallel and by issuing the same amount of grants to those mobile terminals that have (more) data to transmit, i.e. which are unhappy, the interference headroom is shared in a fair way.

However, applying the above simple approach to a multi-carrier system does not lead to an optimal usage of transmission resources neither from the point of view of the network (i.e. on a radio interface) nor from the point of view of a single terminal. For example, a simple happy bit approach cannot avoid that too many mobile terminals select the same carrier for their transmissions, which causes high interference on this carrier, while other carriers remain unused. Therefore, some control is required of how the mobile terminals select carriers for transmission. Such a control technique should provide for an optimized usage of the available transmission resources from a network point of view, i.e. on a radio interface. Further it should provide for an optimized usage of the available transmission resources from a terminal point of view, i.e. the transmission data throughput should be maximized which includes the requirements of optimal usage of the available transmission power and minimized interference (maximized robustness) on the used carriers. Moreover, the control technique should lead to optimum results in very different circumstances regarding the widely varying possible transmission requirements of multiple terminals on multiple transmission carriers.

SUMMARY

There is a demand for an efficient technique for controlling data transmissions of multiple terminals in a multi-carrier data transmission network in order to optimise a system data rate, a user data rate and a robustness of the transmissions.

This demand is satisfied by a method of performing one or more data transmissions in a multi-carrier data transmission network. The method comprises, in a transmitting device, the steps of requesting transmission resources from a resource granting device; receiving, in response to the request, one or more transmission grants from the resource granting device, wherein each transmission grant indicates a data rate and a data class granted for a specific transmission carrier; and initiating one or more transmissions of data associated with one or more of the granted data classes on one or more of the granted transmission carriers.

The multi-carrier network may for example be a mobile network such as a CDMA network. The transmitting device may be a mobile terminal, e.g. a User Equipment (UE) device of an UMTS network. The data transmissions may comprise transmissions of user data as well as of signalling data. The resource granting device may be part of the network and may be implemented, for example, in a radio base station such as an evolved Node B in a WCDMA network.

The transmitting device may allocate one or more of the granted carriers for the data transmissions according to an amount of data to be transmitted and available transmission power. For example, in case no data is to be transmitted in a particular class or only limited transmission power is available, the transmitting device may use only part of the granted data transmission capacity on one or more carriers.

Multiple grants indicating different data classes may be received. In this case, one or more of the granted carriers may be allocated according to a predetermined priority ranking of the data classes. For example, data of higher priority data classes will be scheduled prior to data of lower priority classes for transmission. Thus, in a situation with limited transmission power the higher priority data will be transmitted with higher probability.

According to one realization, in case of an ongoing transmission of data of a low priority data class on a first granted carrier and of data of a high priority data class on a second granted carrier, a transmission power for the first carrier may be reduced to avoid interference with the transmission on the second carrier.

In one mode, multiple grants indicating one and the same data class and different data rates may have been received. In this mode, one or more of the granted carriers may be allocated in an order of decreasing data rates. This may apply in cases in which the transmitting device detects decreasing quality of transmission over the radio interface, e.g. near the coverage border. In these cases, the transmitting device may operate to reduce and eventually terminate the transmission on the data carrier with the lowest grant, the second lowest grant, etc. Vice versa, in case an increasing quality of transmission conditions is detected, the transmitting device may use not only the data carrier with the highest granted data rate, but additionally the carrier with the second highest grant, etc.

In this mode, in case the device is only able to transmit on a single carrier, the terminal may select a carrier for transmission based on at least one of the carrier with the highest grant, the granted carrier which requires the least transmission power for a control channel associated with the carrier, and the granted carrier with the best signal-to-noise ratio.

In one implementation, allocating one or more of the granted carriers comprises allocating less transmission power for a control channel associated with a reception carrier in order to allocate more transmission power for a transmission carrier. In this way, a maximum portion of the available, limited transmission power is used for data transmission. Eventually, the transmission on the control channel may be terminated. This may include to also terminate the associated reception carrier. Additionally or alternatively, the control channel associated with an unused transmission carrier may be terminated in order to use the transmission power instead for the data transmission on the carrier with the highest grant.

In a different implementation, which may be combined with the implementation outlined above, in case of limited transmission power an equal fraction of the available transmission power is allocated to each of the granted transmission carriers. The power per carrier may then control the data rate per carrier by the usage of appropriate transport formats.

The above-mentioned demand is also satisfied by another method of performing one or more data transmissions in a multi-carrier data transmission network. The method is performed in a transmitting device and comprises the steps of requesting transmission resources from a resource granting device; receiving, in response to the request, multiple transmission grants from the resource granting device, wherein each transmission grant indicates a data rate granted for a specific transmission carrier and the multiple grants indicate different data rates; and initiating one or more data transmissions on multiple granted transmission carriers in an order of decreasing granted data rates. In this method, the received grants may or may not indicate data classes.

The above-mentioned demand is further satisfied by a method of controlling one or more data transmissions in a multi-carrier data transmission network. The method is performed in a resource granting device and comprises the steps of receiving a request for transmission resources from a transmitting device; and providing, in response to the request, one or more transmission grants to the transmitting device, wherein each transmission grant indicates a data rate and a data class granted for a specific transmission carrier, and the one or more transmission grants are provided to the transmitting device for initiating one or more transmissions of data associated with one or more of the granted data classes on one or more of the granted transmission carriers.

In one mode, the grants indicating a specific data class for a specific carrier are provided to multiple transmitting devices. In this way, the granting device may implement a scheme in which particular data classes are associated with specific of the multiple carriers. For example, the specific data class may be one or more high priority data classes, which then are mapped onto one (or more) particular carrier. As a concrete example, a data class associated with (high priority) signalling may be mapped onto one and the same carrier for all transmitting devices. Additionally or alternatively, one or more low (or high) data rate classes may be mapped onto particular carriers. A high/low data rate may be a data rate above/below a predetermined threshold data rate. The threshold data rate may, e.g., relate to an intracarrier interference.

In one implementation of this mode, a specific data class on a specific carrier is granted to multiple transmitting devices in an alternating fashion in time. For example, a high data rate class may be granted to each one of a sequence of transmitting devices at a time.

In one representation of the method, for one and the same data class grants on multiple carriers with different data rates are provided to the transmitting device. A total data rate may be distributed over several carriers for a transmitting device even in case the total data rate might in principle be transmitted over a single carrier. According to a particular mode of this representation, for multiple transmitting devices the grant with a maximum data rate is distributed over the multiple carriers. In other words, groups of transmitting devices may preferably (e.g. in case of limited power) transmit on different carriers.

The above demand is also satisfied by another method of controlling one or more data transmissions in a multi-carrier data transmission network. The method, which is performed in a resource granting device, comprises the steps of receiving a request for transmission resources from a transmitting device; and providing, in response to the request, multiple transmission grants to the transmitting device, wherein each transmission grant indicates a data rate granted for a specific transmission carrier and the multiple grants indicate different data rates, and the multiple transmission grants are provided to the transmitting device for initiating one or more data transmissions on multiple granted transmission carriers in an order of decreasing granted data rates. In this method, the provided grants may or may not indicate data classes.

Further, the abovementioned demand is satisfied by a computer program product, which comprises program code portions for performing the steps of one or more of the methods and method aspects described herein when the computer program product is executed on one or more computing devices, for example a transmitting device or a resource granting device. The computer program product may be stored on a computer readable recording medium, such as a permanent or re-writeable memory within or associated with a computing device or a removable CD-ROM, DVD or USB-stick. Additionally or alternatively, the computer program product may be provided for download to a computing device, for example via a data network such as the Internet or a communication line such as a telephone line or wireless link.

To meet the above-mentioned demand, further a transmitting device adapted for scheduling one or more data transmissions in a multi-carrier data transmission network is proposed. The transmitting device comprises a first component adapted to request transmission resources from a resource granting device; a second component adapted to receive, in response to the request, one or more transmission grants from the resource granting device, wherein each transmission grant indicates a data rate and a data class granted for a specific transmission carrier; and a third component adapted to initiate one or more transmissions of data associated with one or more of the granted data classes on one or more of the granted transmission carriers.

The above demand is further satisfied by another transmitting device adapted for scheduling one or more data transmissions in a multi-carrier data transmission network. This transmitting device comprises a first component adapted to request transmission resources from a resource granting device; a second component adapted to receive, in response to the request, multiple transmission grants from the resource granting device, wherein each transmission grant indicates a data rate granted for a specific transmission carrier and the multiple grants indicate different data rates; and a third component adapted to initiate one or more data transmissions on multiple granted transmission carriers in an order of decreasing granted data rates.

The demand is still further satisfied by a resource granting device adapted for controlling one or more data transmissions in a multi-carrier data transmission network. The resource granting device comprises a first component adapted to receive a request for transmission resources from a transmitting device; a second component adapted to provide, in response to the request, one or more transmission grants to the transmitting device, wherein each transmission grant indicates a data rate and a data class granted for a specific transmission carrier, and the one or more transmission grants are provided to the transmitting device for initiating one or more trans-missions of data associated with one or more of the granted data classes on one or more of the granted transmission carriers.

Still further, the demand is satisfied by another resource granting device adapted for controlling one or more data transmissions in a multi-carrier data transmission network. This resource granting device comprises a first component adapted to receive a request for transmission resources from a transmitting device; and a second component adapted to provide, in response to the request, multiple transmission grants to the transmitting device, wherein each transmission grant indicates a data rate granted for a specific transmission carrier and the multiple grants indicate different data rates, and the multiple transmission grants are provided to the transmitting device for initiating one or more data transmissions on multiple granted transmission carriers in an order of decreasing granted data rates.

Further, the above-mentioned demand is satisfied by multicarrier mobile network comprising at least one of the resource granting devices outlined above and a mobile terminal comprising at least one of the transmitting devices outlined above.

BRIEF DESCRIPTION OF THE DRAWINGS

In the following, the invention will further be described with reference to exemplary embodiments illustrated in the figures, in which.

DETAILED DESCRIPTION OF PREFERRED EMBODIMENTS

In the following description, for purposes of explanation and not limitation, specific details are set forth, such as a W-CDMA system including transmitting devices implemented on mobile terminals and a resource granting device in the network configured according to some specific rules for controlling and performing uplink transmissions, in order to provide a thorough understanding of the current invention. It will be apparent to one skilled in the art that the current invention may be practiced in other embodiments that depart from these specific aspects. For example, the techniques proposed herein may be used not only for CDMA networks, but may in fact be used in any wireless or wireline data transmission network in which multiple carriers may be assigned on request to multiple transmitting devices.

Those skilled in the art will further appreciate that functions explained herein below may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the current invention is described as a method, it may also be embodied in a computer processor and a memory coupled to a processor, wherein the memory is encoded with one or more programs that perform the steps of the methods disclosed herein when executed by the processor.

Figure 1:
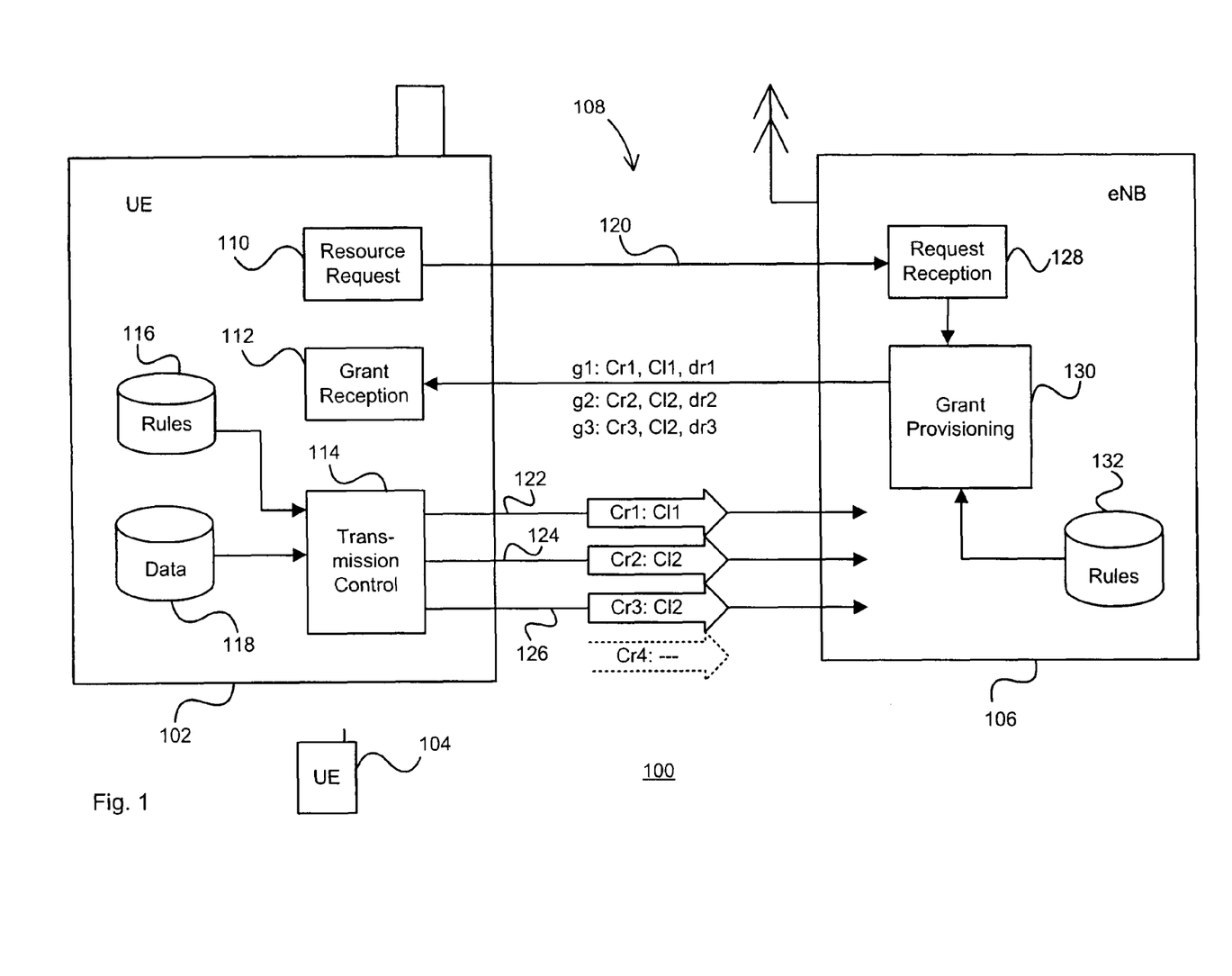
FIG. 1 schematically illustrates an embodiment of a multi-carrier data transmission network including multiple transmitting devices and a resource granting device.

FIG. 1 schematically illustrates as an embodiment of a multi-carrier network, such as a W-CDMA network 100, including two transmitting devices 102 and 104 and a resource granting device 106. Each of the transmitting devices 102 and 104 may, for example, be implemented in a mobile terminal, namely a User Equipment (UE) device adapted for communication with the W-CDMA network 100. The resource granting device 106 may be implemented in a network component for controlling a radio interface 108 of the network 100, and may for example be implemented in an evolved Node B (eNB) of the W-CDMA network 100.

Functional components of the transmitting device 102 are illustrated in more detail in FIG. 1. The transmitting device 104 may or may not comprise similar functional components. The device 102 comprises a resource request component 110, a grant reception component 112, a transmission control component 114, a rule repository 116 and a transmission data buffer 118. An operation of the various functional components will be described with reference to the flow diagram of FIG. 2.

Figure 2:
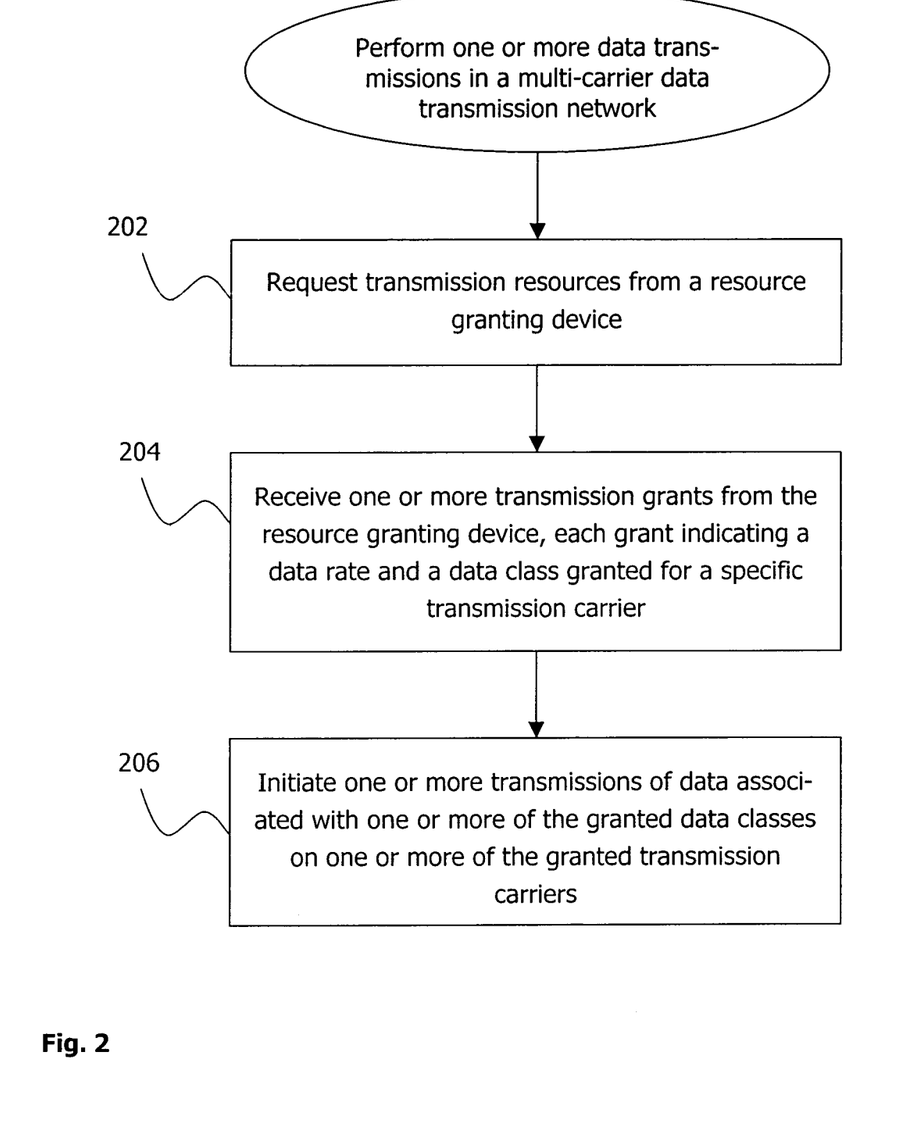
FIG. 2 is a flow diagram illustrating an operation of one of the transmitting devices of FIG. 1.

Generally, the transmitting device 102 operates to perform one or more uplink data transmissions in the multi-carrier data transmission network 100. In step 202, the resource request component 110 requests transmission resources from the resource granting device 106. The request, which is illustrated by arrow 120 in FIG. 1, may for example be represented by a signalling message sent over the radio interface 108 towards the resource granting device 106. In step 204, the grant reception component 108 receives multiple transmission grants g1-g3 which have been provided by the resource granting device 106 in response to the request 120. The resource granting device 106 may use various signalling mechanisms for transmitting the grants g1-g3 to the transmitting device 102.

Each of the transmission grants g1-g3 indicates a data rate dr and a data class Cl granted for a specific transmission carrier Cr. Specifically, different grants may relate to different data classes on different data carriers; for example, according to grant g1, data class Cl1 is assigned to carrier 1, while according to grants g2 and g3, the data class Cl2 is assigned to the carriers 2 and 3. As illustrated by grants g2 and g3, multiple grants indicating one and the same data class for different carriers may be provided. The data rates dr2 and dr3 may be the same or may indicate different rates. The latter configuration may be used by the resource granting device 106 to further control a data transmission scheduling of the transmitting device 102, as will be described below. As described herein, a single grant indicates one data class only; in other embodiments, a single grant may also indicate multiple data classes for a carrier.

The transmission control component 114 is adapted to receive an indication related to the grants g1-g3 from component 112 and to extract, in response to the reception thereof, appropriate rules from the rule repository 116. Further, the transmission control component determines from the content of the buffer 118 which data have to be transmitted on the radio interface 108; in particular, the data classes and an amount of data per data class are evaluated. The data classes may relate to particular traffic classes or, in other words, particular data services. For example, a data class may include all signalling data to be transmitted on a signalling radio bearer (SRB) on the interface 108. Other data classes may correspond to a traffic class 'Conversational' including speech data (including, e.g., Voice over IP); 'Streaming' including streaming data such as (mobile) TV data; 'Interactive' including data for gaming, messaging, and similar services; and 'Background' or "Best Effort" for any other data.

Based on the data available in buffer 118, the grants g1-g3 and the appropriate rules from the repository 116, the control component evaluates and initiates multiple data transmissions 122-126 on multiple carriers provided on the radio interface 108 of network 100. Generally, the data are transmitted on one or more of the granted transmission carriers Cr1 and Cr2 (not other carriers) and are associated with one or more of the granted data classes Cl1 and Cl2 (not other classes). Specifically, as illustrated in FIG. 1, the data transmission 122 is performed on carrier Cr1 for transmitting data of class Cl1 with a data rate smaller or at most equal to dr1. The trans-missions 124 and 126 on carriers Cr2 and Cr3, respectively, are both for transmitting data of data class 2. No data is transmitted on carrier Cr4, as no grant has been received indicating this carrier.

By indicating in the grants g1-g3 not only a data rate for each of the multiple carriers Cr1-Cr3, but also a data class Cl1 or Cl2, the resource granting device 104 can control the usage of transmission resources in the transmitting device 102, as will be described in more detail further below.

Figure 3:
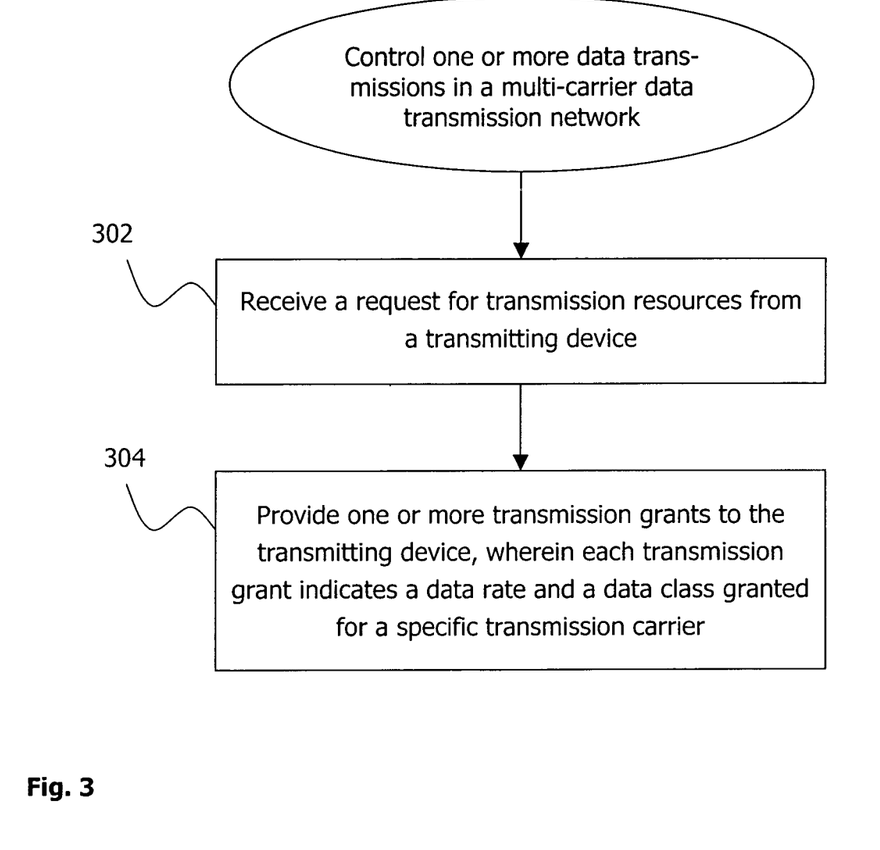
FIG. 3 is a flow diagram illustrating an operation of the resource granting device of FIG. 1.

Before elaborating on the details of how data transmissions may be scheduled by the transmission control component 114 in the transmitting device 102, an operation of the resource granting device 106 of FIG. 1 will be described in some more detail with reference to the flow diagram of FIG. 3. Generally, the resource granting device 106 operates to suitably control a scheduling of data transmissions in the transmitting devices 102 and 104 (and possibly further transmitting devices).

The resource granting device 106 comprises a request reception component 128, a grant provisioning component 130 and a rule repository 132. In step 302, the request reception component 128 receives the request 120 from the transmitting device 102. A control signal indicative of the request 120 is provided to the grant provisioning component 130. In response to the control signal, appropriate rules stored in the repository 132 are accessed by the component 120. Generally, the rules stored in the repository 132 are related to a usage of the multiple carriers Cr1-Cr4 provided on the radio interface 108 for the multiple transmitting devices 102, 104, etc. The rules stored in the repository 132 will in general be different from the rules stored in the repository 116 in the transmitting device 102; however, the content of both repositories 116 and 132 will be based upon common principles of how to schedule data transmissions in order to optimize a resource usage on the radio interface 108 and in the device 102 in different situations. The common principles will exemplarily discussed with reference to the subsequent figures.

Based upon the indications in the resource request 120 and the rules extracted from the repository 132, the resource granting component 130 derives the transmission grant g1-g3 and provides these to the transmitting device 102 by using an appropriate downlink signalling channel.

Figure 4A:
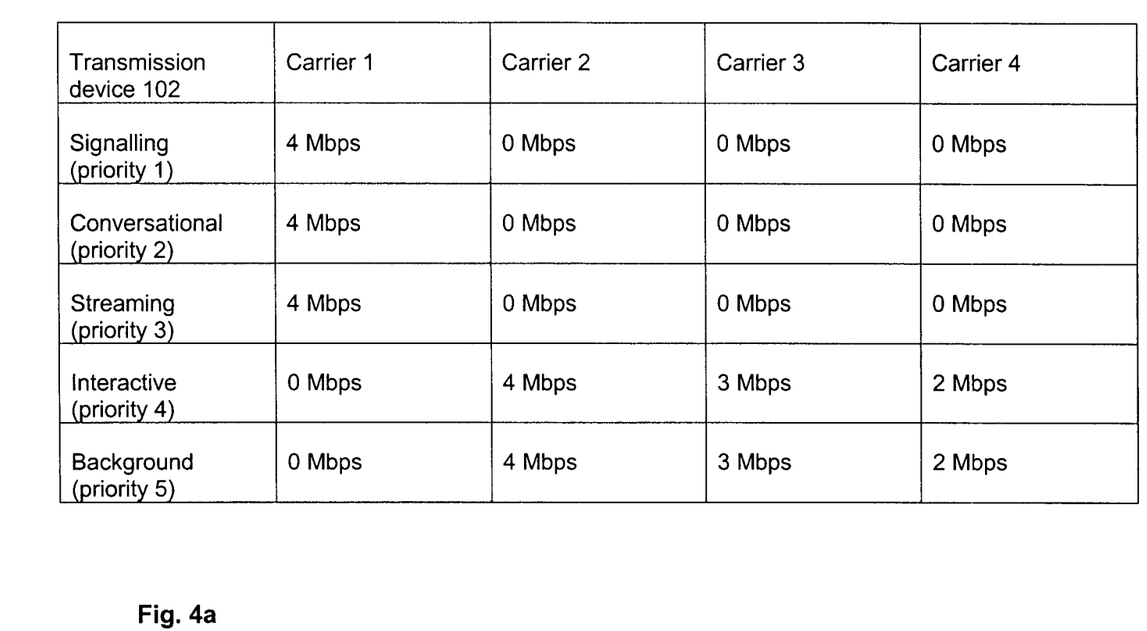
FIGS. 4a, 4b schematically illustrate a first and a second set of grants provided to the transmitting devices by the resource granting device of FIG. 1.
Figure 4B:
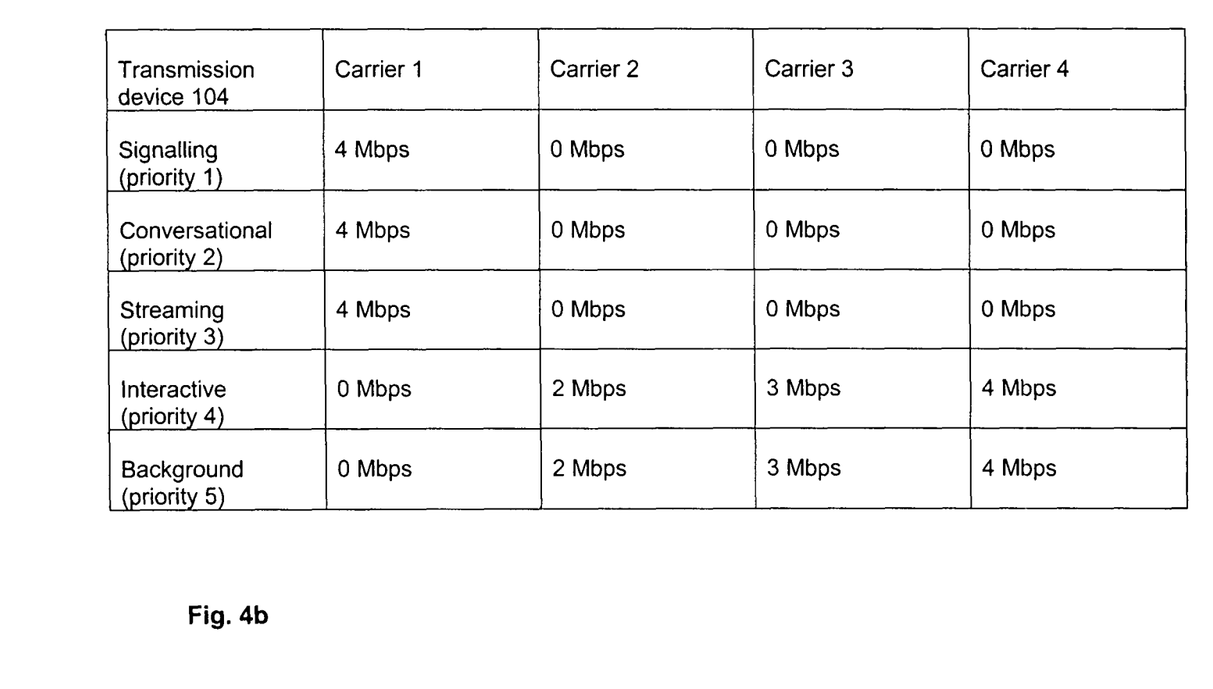

Each of FIGS. 4a and 4b schematically illustrates a set of grants. For the sake of illustration it will be assumed in the following that the grant set of FIG. 4a has been provided by the resource granting device 106 to the transmitting device 102 and the grant set of FIG. 4b has been provided by the resource granting device 106 to the transmitting device 104 (in a different embodiment, the two grant sets may also be provided to one and the same transmitting device at different time points).

As illustrated in FIG. 4a, the first transmitting device has been granted a maximum data rate of 4 Mbps (Megabits per second) for each of the data classes Signalling, Conversational (e.g., speech data) and Streaming (for example, mobile TV data) on Carrier 1 ('Cr1' in FIG. 1), while no such data may be transmitted on Carriers 2-4 ('Cr2'-'Cr4' in FIG. 1). The data classes Interactive (for example, data related to gaming) and Background (any other data to be transmitted) have been assigned grants on each of the Carriers 2-4, however, different data rates have been granted on each of the different carriers. Specifically, a large grant of 4 Mbps has been assigned to both classes on Carrier 2, a smaller grant of 3 Mbps has been granted on Carrier 3 and an even smaller grant of 2 Mbps has been granted on Carrier 4 to each of the two classes. Each of the data classes have also been assigned priorities from 1 to 5, such that the transmitting device may rank the data classes accordingly when scheduling data transmissions, as described below.

As illustrated in FIG. 4b, the transmitting device 104 has also been granted a data rate of 4 Mbps on carrier 1 for the high priority classes Signalling, Conversational and Streaming. Moreover, the low priority classes Interactive and Background are also assigned to the Carriers 2-4, however, a maximum data rate of 4 Mbps has been granted on Carrier 4, and smaller data rates have been granted on carriers 3 and 2.

Principally, the transmitting device will allocate one or more of the granted frequency carriers according to an amount of data (in the granted data class) to be transmitted, and according to an available transmission power. Referring exemplarily to the functional components of transmitting device 102 illustrated in FIG. 1, the transmission control component will evaluate an amount of data for each data class available in data buffer 118, and will consult the rule repository 116 to extract rules applicable for a transmission of the data in conformance to the grants received from the resource granting device 106. In the embodiment described here, a first rule indicates that data of multiple data classes are scheduled for transmission in an order of decreasing data class priority as long as transmission power is available. Thus, assuming that data is available in the transmission buffer 118 for all data classes, the transmission control component 114 will allocate first the granted Carrier 1 for the high priority classes Signalling, Conversational and Streaming, and will only allocate the Carriers 2-4 for the low priority classes Interactive and Background if transmission power is left.

A second rule assumed to be in the repository 116 specifies that, in case multiple carriers have been granted for one and the same data class, the carrier with the highest granted data rate has to be allocated first, and so on, i.e. the carriers have to be allocated in an order of decreasing granted data rates, as far as data has to be transmitted and transmission power is available.

When applying the rules described so far, generally a transmitting device will start scheduling data of the highest priority data class on a carrier that has the highest grant for that data class and will end with scheduling data of the lowest priority data class on a carrier which has the lowest grant for this low priority data class. Specifically, the transmitting device 102 will allocate carriers and schedule data on the allocated carriers as follows:

Signalling data on Carrier 1,
Conversational on Carrier 1,
Streaming on Carrier 1,
Interactive on Carrier 2,
Interactive on Carrier 3,
Interactive on Carrier 4,
Background on Carrier 2,
Background on Carrier 3,
Background on Carrier 4.

Assuming that the transmitting device 104 applies the same rules as discussed above, then the device 104 will schedule data for transmission as follows:

Signalling data on Carrier 1,
Conversational on Carrier 1,
Streaming on Carrier 1,
Interactive on Carrier 4,
Interactive on Carrier 3,
Interactive on Carrier 3,
Background on Carrier 4,
Background on Carrier 3,
Background on Carrier 2.

By providing the grant sets illustrated in FIGS. 4a and 4b (and based on the above-discussed rules), the resource granting device 106 controls a scheduling of data transmissions in the transmitting devices 102 and 104 in order to achieve an optimized usage of transmission resources on the radio interface 108 and in each of the transmitting devices. The Signalling, Conversational and Streaming data classes typically comprise data related to low data rate services, while in the Interactive and Background data classes high data rates possibly occur, which may cause a high noise rise on those carriers on which they are scheduled. The grant sets of FIGS. 4a and 4b ensure that data for low data rate/high priority services can be transmitted undisturbed from data transmitted for high data rate/low priority services.

Moreover, referring to the grants for the Interactive and Background classes, by distributing the total data rate for a data class on multiple carriers with differing data rates per carrier, the data transmissions from a plurality of devices can be more evenly distributed on the multiple carriers of the radio interface. In this way, an interference between different transmitting devices on the same carriers can be minimized, which leads to an optimal usage of transmission resources of the individual transmitting devices.

Figure 5A:
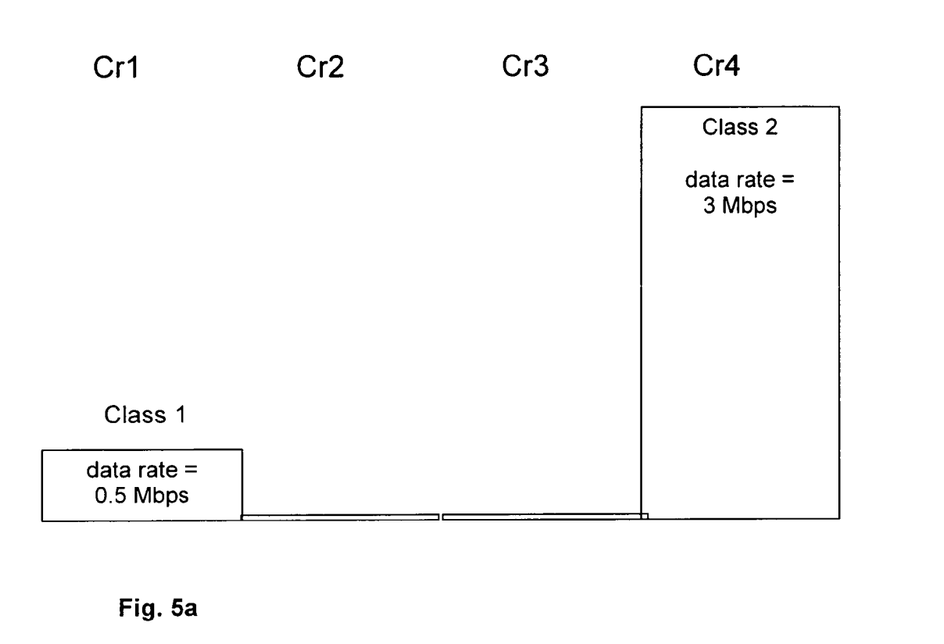
FIGS. 5a, 5b schematically illustrate a third set of grants and its usage by one of the transmitting devices of FIG. 1.
Figure 5B:
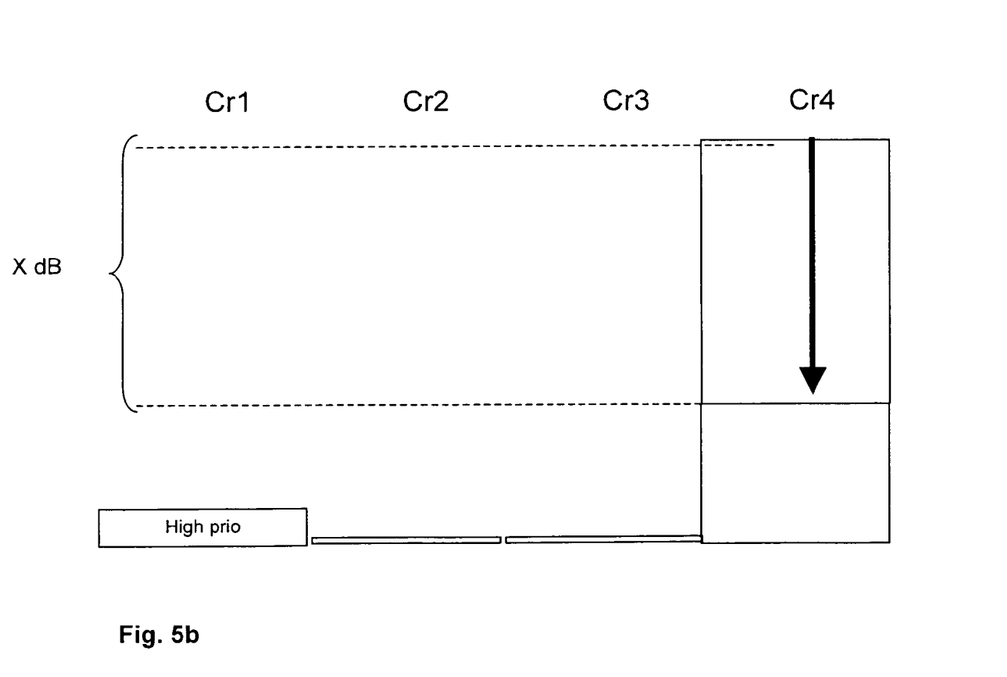

In FIG. 5a a situation is illustrated, in which a transmitting device has been provided two grants. The first grant relates to data transmissions on Carrier 1 with a data rate of up to 0.5 Mbps for a data class 1, which is assumed to be a high priority data class such as, for example, signalling. The second grant has been provided on Carrier 4 for a lower priority data class 2, e.g. Conversational, with a maximum data rate of 3 Mbps. According to the prioritizing rule described above, data is scheduled first for the high priority data class 1 on carrier 1 and data of the low priority data class 2 is transmitted only on carrier 4 in case transmission power is left. However, even in case sufficient transmission power is available, there may occur situations in which the transmission power has to be reduced. For example, in the situation depicted in FIG. 5a and when transmitting data on both carriers with the maximum granted data rates, the power difference between carrier 1 and carrier 4 may be too large, such that due to limited image rejection the transmission on carrier 4 will interfere with the power control on carrier 1. A supplementary rule may be provided in the transmitting device in this case, according to which the transmission power for those carrier granted for a low priority service has to be reduced. In the example depicted in FIG. 5a, the power of carrier 4 has to be reduced to a level such that a power control for carrier 1 can handle the disturbance. This situation with a reduction of an appropriate amount of X dB on carrier 4 is illustrated in FIG. 5b.

Figure 6:
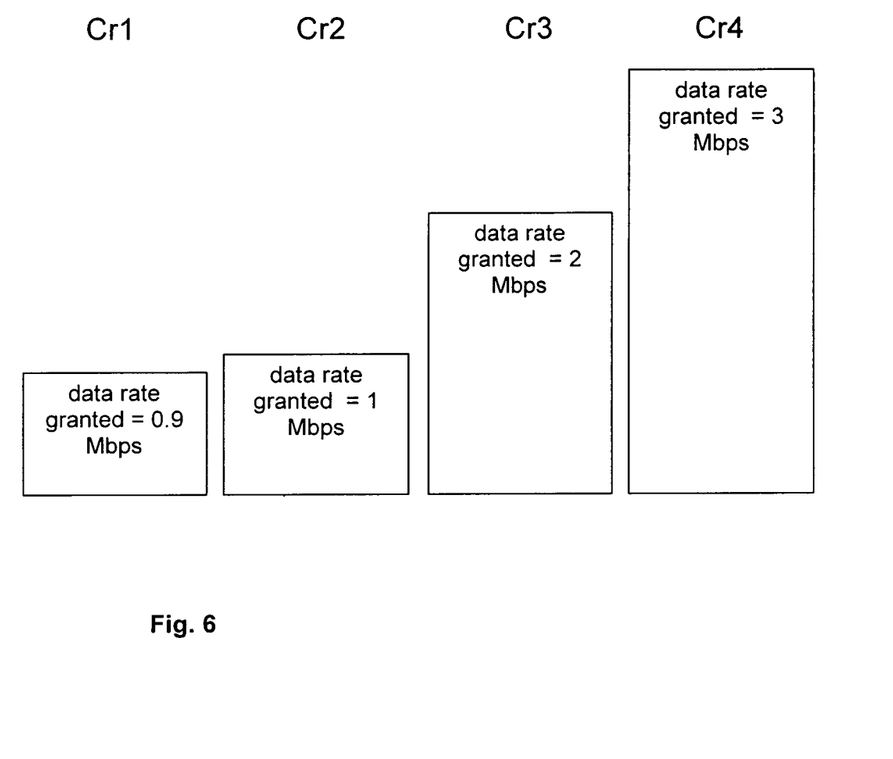
FIG. 6 schematically illustrates a fourth set of grants provided to one of the transmitting devices by the resource granting device of FIG. 1.

With reference to FIG. 6 a number of rules for scheduling data of one and the same data class on multiple carriers will now be discussed. For the sake of illustration it will be referred to the functional components of transmitting device 102 as illustrated in FIG. 1 in the following. The rules to be discussed may additionally be implemented in repository 116 of transmitting device 102 for use by the transmission control component 114. As shown in FIG. 6, the transmitting device 102 has been granted different data rates on the four Carriers Cr1-Cr4 for a data class, e.g. one of the classes Background or Interactive. A maximum data rate of 3 Mbps has been granted on Carrier 4 and smaller data rates have been granted on Carriers 3, 2 and 1. Various situations will be considered below with regard to an amount of data to be transmitted in the granted class and with regard to an available transmission power.

In case of a non-limited amount of data to be transmitted and with unlimited available transmission power (for example, the transmitting device 102 is located near the base station or may otherwise detect good transmission conditions), the transmitting device will allocate all four carriers Cr1-Cr4 up to the respectively granted data rates and will schedule and transmit data accordingly.

In a case in which a limited amount of user data only has to be transmitted, and unlimited transmission power is available, the transmitting device may apply a rule, according to which the granted carriers have to be allocated in an order of decreasing granted data rate. Thus, firstly the carrier 4 will be allocated up to the maximum granted data rate of 3 Mbps. In case further data has to be transmitted, carrier 3 will be allocated up to the maximum data rate of 2 Mbps, and so on as long as data have to be transmitted.

The same rule may also be applied in a case in which an unlimited amount of data has to be transmitted, but in which the transmission power is limited, e.g. because the transmitting device is located near the coverage border or otherwise bad transmission conditions. The transmitting device may allocate at first place the carrier with the highest granted data rate and will continue allocating carriers with decreasing granted data rates as long as there is transmission power available. In the example depicted in FIG. 6, the transmission device will allocate carrier 4 first up to the maximum granted data rate and will only continue with allocating carriers 3, 2 and 1 according to the respective grants as long as transmission power is available.

Consider next a dynamic situation, in which the available transmission power starts to become limited, because the transmission conditions over the radio interface become worse. Again the rule of preferring carriers with the largest granted data rates may be applied, i.e. the transmitting device will in a first place reduce the transmission power for the carrier with the lowest grant, i.e., carrier 1 in the example illustrated in FIG. 6. This may mean to choose a different transport format and reducing the data rate on this carrier. Eventually, the transmission may has to be terminated entirely on the carrier with the lowest granted data rate. In case of still further limited transmission power, the transmitting device will then reduce power or terminate transmitting on the carrier with the second lowest grant (Carrier 2 in FIG. 6), etc. If a transmission is terminated on a transmission carrier, also the uplink physical control channel (e.g., a DPCCH, "Dedicated Physical Control Channel" in a 3GPP W-CDMA system) associated with that carrier might be terminated in order to save transmission resources.

In a converse situation in which the transmitting device detects an increase in the quality of transmission conditions, the device may turn on an uplink physical control channel for a currently unused (but granted) carrier and may then start transmitting on this carrier with up to the data rate granted for this carrier. For example, in case the transmitting device transmits only on carrier 4 in FIG. 5 due to limited power, in case radio conditions become better, the device may start transmitting also on carrier 3, and eventually on carriers 2 and 1.

Above it has been described that in case of limited transmission power a criterion for choosing one of multiple granted carriers (for one data class) may be to choose the carrier with the largest, second largest, etc. data rates granted. However, another rule may be applied in case the transmitting device is able to transmit on only one single carrier: In this case, the transmitting device may select the carrier which requires the lowest transmission power for an associated control channel, e.g., a DPCCH. In the example of FIG. 6, this may be any of the carriers C1-Cr4. By minimizing the transmission power for the control channels, this rule allows to maximize the transmission power available for the single remaining data transmission carrier.

Another criterion for choosing among multiple granted transmission carriers in case transmission power is available only for one or few of the carriers may be based on a signal-to-noise-ratio (SNR) of each of the multiple transmission carriers. An appropriate measure for the SNR ratio may be the Eb/NO value, which is known to the skilled person. The SNR may be the only criterion used for selecting from the multiple granted carriers, e.g., the carrier with the lowest SNR may be chosen, or this criterion may be applied in addition to other criteria such as the criterion of selecting a transmission carrier based on a lowest transmission power required for the associated control channel described above.

The principle of minimizing a usage of transmission power for control channels in order to maximize a transmission power available for transmission carriers may also be applied to control channels associated with downlink carriers. Namely, in a situation of limited transmission power the transmitting device may start reducing a transmission power for a control channel associated with a reception (downlink) carrier. This principle may be applied for downlink carriers up to the last but one downlink carrier (or may in particular situations even be applied to the last downlink carrier). More specifically, consider a situation with two downlink carriers and one uplink carrier, for example, the Carrier 4 of FIG. 6. Due to limited transmission power, the transmitting device may face the situation that not even the lowest possible data rate can be supported on Carrier 4. Then the transmitting device may gradually reduce the output power for one of the control channels associated with the reception carriers. In this case, eventually the lowest possible data rate (smallest transport format) may be provided from the network to the transmitting device, when the radio bearer is set up with RRC (Radio Resource Control) signalling. Eventually, the transmitting device may terminate the corresponding control channel entirely. In case one of the two downlink carriers is paired with the uplink carrier, preferably the control channel for the other, unpaired reception carrier is reduced or terminated. Generally, in case the control channel is terminated, the device may terminate also the reception of data from the associated reception carrier. The transmission power saved by reducing or terminating the control channel for the reception carrier may then be used for maintaining at least a transmission with the lowest possible data rate on the last remaining uplink carrier.

An alternative approach of selecting one out of multiple granted carriers in case of limited available transmission power is to assign an equal fraction of the total available power to each of the granted carriers. In this case, the power per carrier may be used as the basis for selecting an appropriate transport format on each carrier.

The rules discussed hereinbefore ensure that the transmitting device makes efficient use of the available transmission power in the case of multiple granted channels for one data class, but also in cases in which grants are provided without any indication of a data class, such that the transmitting device is free to transmit data of any data class on the granted carriers.

Figure 7:
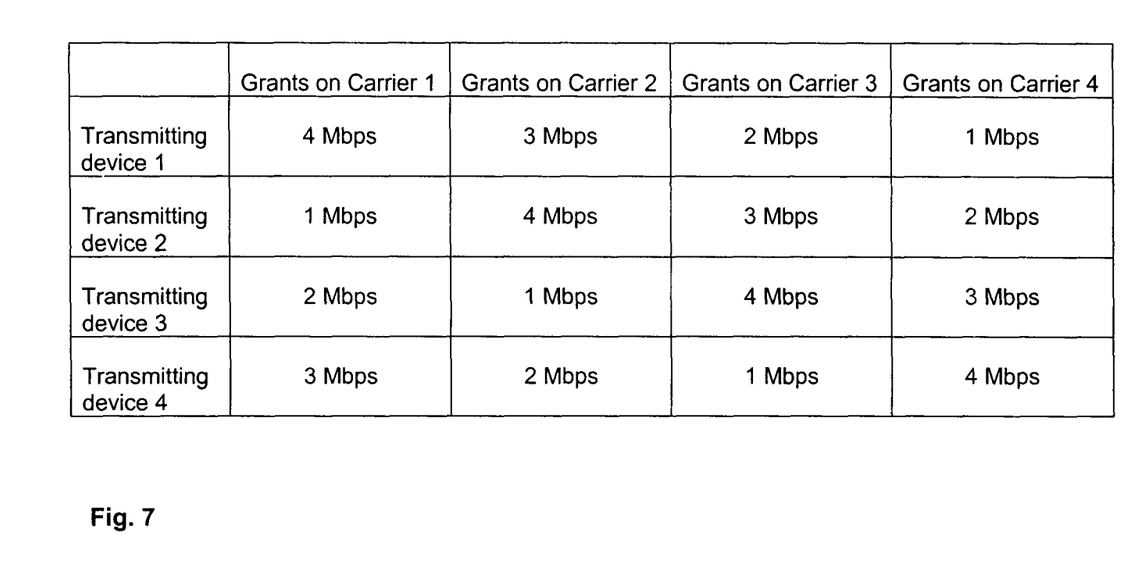
FIG. 7 schematically illustrates a fifth set of grants provided to multiple transmitting devices by the resource granting device of FIG. 1.

FIG. 7 illustrates an example for grants sets provided by a resource granting device to multiple transmitting devices (devices 1-4). No distinction between different data classes is made, i.e. it may for example be assumed that several grants on different carriers are provided for one and the same data class. The data class may, e.g., relate to a potentially high data rate service such as Background traffic. It is assumed that the transmitting devices have implemented the rule that data will be scheduled starting with the granted carrier with the largest granted data rates, etc., which has been described above with reference to FIG. 6. This allows the resource granting device to control the transmission behaviour of the devices on the radio interface, as described now. In particular, as illustrated in FIG. 7, multiple grants with differing data rates are provided to each of the devices. Further, each of the devices has assigned a maximum data rate on a different of the carriers, i.e. the device 1 has been granted a maximum data rate of 4 Mbps on carrier 1, the device 2 has been granted a maximum data rate of 4 Mbps on carrier 2, and so on.

In a situation in which some or all of the transmitting devices 1-4 are in the powerlimited regime (e.g., are located near to the coverage border) the devices will follow the above-mentioned rule and will transmit on one carrier only, namely the carrier with the highest grant. In other words (assuming that all devices are power limited), device 1 will transmit on carrier 1 only, device 2 will transmit on carrier 2 only, and so on. Vice versa, as can be inferred from FIG. 7, on carrier 1 only device 1 is transmitting, on carrier 2 only device 2 is transmitting, etc. The configuration illustrated in FIG. 7 thus minimizes a disturbance of the transmission from device 1 on carrier 1, a disturbance of the transmission from device 2 on carrier 2, etc. In this way, the scheme of grants provided by the resource granting device to the multiple transmitting devices optimizes a coverage of the network.

Figure 8:
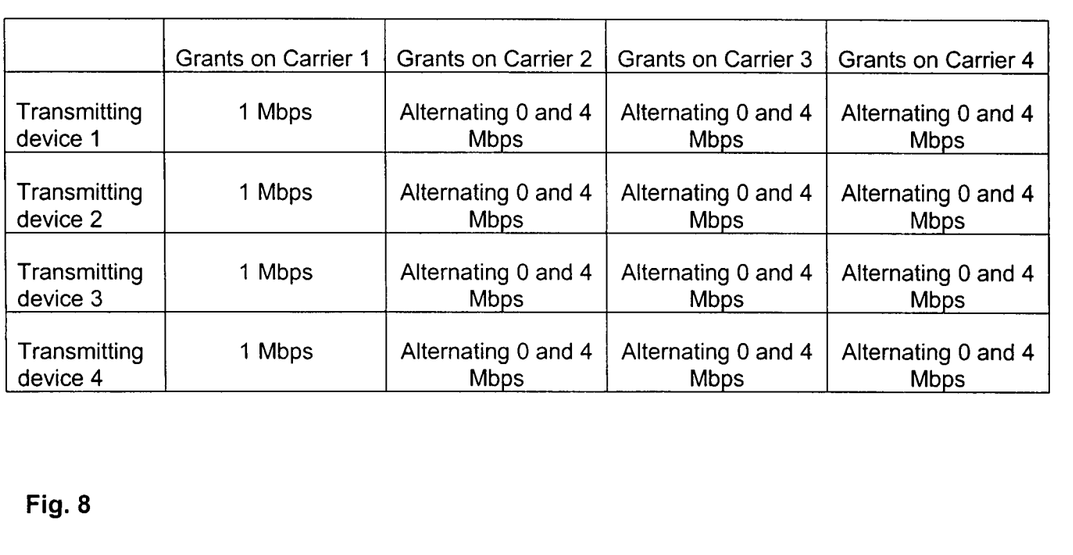
FIG. 8 schematically illustrates a sixth set of grants provided to multiple transmitting devices by the resource granting device of FIG. 1.

FIG. 8 illustrates a situation in which on Carrier 1 each of four transmitting devices 1-4 has been granted a low data rate of 1 Mbps. The grants on Carrier 1 may, for example, indicate a high priority data class such as Signalling. Further grants are provided on the Carriers 2-4 to the transmitting devices, which may be related to potentially high data rate traffic such as Background. In particular, new grants for these carriers may be provided at regular time intervals to the devices, which allows to implement transmission regimes on the radio interface.

The pattern illustrated in FIG. 8 comprises to alternately assign zero data rates (0 Mbps) and high data rates (4 Mbps) to each of the devices on the carriers 2-4. For example, only one transmitting device may have granted a high data rate of 4 Mbps at a time on each of the carriers 2-4. More particularly, e.g. at a time interval the transmission device 1 may have a grant of 4 Mbps on carrier 2, while the remaining devices have a zero grant (i.e. no grant) on this carrier. In a subsequent time interval, device 2 has a grant of 4 Mbps on carrier 2 and the other devices have no grants on this carrier, etc. The same alternating time pattern may be applied to carriers 3 and 4, or the patterns on the different carriers may be shifted with respect to each other.

The pattern of FIG. 8, which may be referred to as 'TDM (Time Division Multiplexing) scheduling' may be used to control a scheduling of (possibly bursty) traffic with potentially high data rates on one or more transmitting devices. The high data rate transmissions may cause interference peaks disturbing speech and other low data rate transmissions on one carrier. Such interferences can be avoided by allocating the low data rate traffic on specific carriers (such as carrier 1 in the examples of FIG. 8; see also FIGS. 4*a* and 4*b*). The high data rate traffic may be granted on separate carriers only and by providing grants in the alternating fashion illustrated in FIG. 8 the transmitting devices are triggered to take turns on the high data rate carriers. In this way, on the one hand the low data rate (high priority) services on carrier 1 are not compromised and on the other hand high data rates are available for the transmitting devices.

In the example embodiments described with reference to FIGS. 6, 7 and 8 it has been assumed that multiple grants indicating one and the same data class are provided for different carriers by the resource granting device to the transmitting devices. It is to be noted, however, that the described techniques of controlling and performing a scheduling of data on multiple carriers work the same in embodiments in which no data class at all is indicated in the grants, i.e. in systems in which the data is generally not distinguished according to data classes or in which a transmitting device may schedule data of one or more data classes onto one or more granted carriers on its own behalf. The scheduling of data by a transmitting device can be controlled based on granting different data rates on multiple carriers. Consequently, advantages related to optimized resource usage on the radio interface and in individual transmitting devices can be achieved also in these embodiments.

By concentrating data classes for high priority (low data rate) services on one or more specific carrier on which data classes for low priority (high data rate) services have low or zero access grants, a particular Quality of Service for the high priority services such as Signalling, Conversational and Streaming can be assured. Potentially high bit rate services may be scheduled on different carriers, on which these data transmissions may cause high noise rise without disturbing transmissions of other transmitting devices, e.g. by applying the above-described TDM scheduling scheme.

The techniques proposed herein generally allow the network to control the scheduling of data on a radio interface in a multi-carrier system in an appropriate way to optimize the usage of transmission resources over a radio interface of a multi-carrier system as well as the usage of transmission resources of a single transmitting device while at the same time minimizing an interference between transmitting devices transmitting on the same carrier(s) and an interference between carriers of one and the same transmitting device.

While the current invention has been described in relation to its preferred embodiments, it is to be understood that this description is for illustrative purposes only. Accordingly, it is intended that the invention be limited only by the scope of the claims appended hereto.

The invention claimed is:

1. A method of performing one or more data transmissions by a transmitting device in a multi-carrier data transmission network, comprising:
   requesting transmission resources from a resource granting device;
   receiving, in response to the request, a plurality of transmission grants from the resource granting device, wherein each transmission grant indicates a data rate and a data class granted for a specific transmission carrier; and
   initiating one or more transmissions of data by the transmitting device associated with one or more of the granted data classes on one or more of the granted transmission carriers;
   wherein multiple transmission grants indicating different data classes are received by the transmitting device and one or more of the granted carriers are allocated by the transmitting device according to a predetermined priority ranking of the data classes.

2. The method according to claim 1, wherein one or more of the granted transmission carriers are allocated for the data transmissions according to an amount of data to be transmitted and available transmission power.

3. The method according to claim 1, wherein multiple transmission grants indicating one and the same data class and different data rates are received and one or more of the granted carriers are allocated in an order of decreasing data rates.

4. The method according to claim 1,
   wherein allocating one or more of the granted carriers comprises allocating less transmission power for a control channel associated with a reception carrier and allocating more transmission power for a transmission carrier.

5. A method of performing one or more data transmissions by a transmitting device in a multi-carrier data transmission network, comprising:
   requesting transmission resources from a resource granting device;
   receiving, in response to the request, multiple transmission grants from the resource granting device, wherein each transmission grant indicates a data rate granted for a specific transmission carrier and the multiple transmission grants indicate different data rates; and initiating, by the transmitting device, one or more data transmissions on multiple granted transmission carriers in an order of decreasing granted data rates.

6. A method of controlling one or more data transmissions in a multi-carrier data transmission network, comprising:
receiving a request for transmission resources from a transmitting device; and
providing, in response to the request, transmission grants to the transmitting device, wherein each transmission grant indicates a data rate and a data class granted for a specific transmission carrier, and the transmission grants are provided to the transmitting device for initiating one or more transmissions of data associated with one or more of the granted data classes on one or more of the granted transmission carriers;
wherein multiple transmission grants indicating different data classes are provided to the transmitting device for allocating, by the transmitting device, one or more of the granted transmission carriers according to a predetermined priority ranking of the data classes.

7. The method according to claim 6, wherein grants indicating a specific data class for a specific carrier are provided to multiple transmitting devices.

8. The method according to claim 7, wherein the specific data class is at least one of a high or low priority data class and a low or high data rate class.

9. The method according to claim 7,
wherein a specific data class on a specific carrier is granted to multiple transmitting devices in an alternating fashion in time.

10. The method according to claim 6,
wherein for one and the same data class grants on multiple carriers with different data rates are provided to the transmitting device.

11. The method according to claim 10, wherein for multiple transmitting devices the grant with a maximum data rate is distributed over the multiple carriers.

12. A method of controlling one or more data transmissions in a multi-carrier data transmission network, comprising:
receiving a request for transmission resources from a transmitting device; and
providing, in response to the request, multiple transmission grants to the transmitting device, wherein each transmission grant indicates a data rate granted for a specific transmission carrier and the multiple transmission grants indicate different data rates, and the multiple transmission grants are provided to the transmitting device for initiating, by the transmitting device, one or more data transmissions on multiple granted transmission carriers in an order of decreasing granted data rates.

13. A transmitting device adapted for scheduling one or more data transmissions in a multi-carrier data transmission network, comprising:
a first microprocessor component adapted to request transmission resources from a resource granting device;
a second microprocessor component adapted to receive, in response to the request, transmission grants from the resource granting device, wherein each transmission grant indicates a data rate and a data class granted for a specific transmission carrier; and
a third microprocessor component adapted to initiate one or more transmissions of data associated with one or more of the granted data classes on one or more of the granted transmission carriers;
wherein the second microprocessor component is adapted to receive multiple transmission grants indicating different data classes and the third microprocessor component is adapted to allocate one or more of the granted transmission carriers according to a predetermined priority ranking of the data classes.

14. A transmitting device adapted for scheduling one or more data transmissions in a multi-carrier data transmission network, comprising:
a first microprocessor component adapted to request transmission resources from a resource granting device;
a second microprocessor component adapted to receive, in response to the request, multiple transmission grants from the resource granting device, wherein each transmission grant indicates a data rate granted for a specific transmission carrier and the multiple transmission grants indicate different data rates; and
a third microprocessor component adapted to initiate one or more data transmissions on multiple granted transmission carriers selected by the transmitting device in an order of decreasing granted data rates.

15. A resource granting device adapted for controlling one or more data transmissions in a multi-carrier data transmission network, comprising:
a first microprocessor component adapted to receive a request for transmission resources from a transmitting device; and
a second microprocessor component adapted to provide, in response to the request, transmission grants to the transmitting device, wherein each transmission grant indicates a data rate and a data class granted for a specific transmission carrier, and the one or more transmission grants are provided to the transmitting device for initiating one or more transmissions of data associated with one or more of the granted data classes on one or more of the granted transmission carriers;
wherein the second microprocessor component is adapted to provide multiple transmission grants indicating different data classes to the transmitting device for allocating, by the transmitting device, one or more of the granted carriers according to a predetermined priority ranking of the data classes.

16. A resource granting device adapted for controlling one or more data transmissions in a multi-carrier data transmission network, comprising:
a first microprocessor component adapted to receive a request for transmission resources from a transmitting device; and
a second microprocessor component adapted to provide, in response to the request, multiple transmission grants to the transmitting device, wherein each transmission grant indicates a data rate granted for a specific transmission carrier and the multiple transmission grants indicate different data rates, and the multiple transmission grants are provided to the transmitting device for initiating, by the transmitting device, one or more data transmissions on multiple granted transmission carriers in an order of decreasing granted data rates.

17. A computer program product for performing one or more data transmissions by a transmitting device in a multi-carrier data transmission network, the computer program product comprising:
a non-transitory computer readable storage medium having computer readable program code embodied in the medium, the computer readable program code comprising:
computer readable program code configured to request transmission resources from a resource granting device;
computer readable program code configured to receive, in response to the request, a plurality of transmission grants from the resource granting device, wherein each transmission grant indicates a data rate and a data class granted for a specific transmission carrier; and computer readable program code configured to initiate one or more transmissions of data by the transmitting device associated with one or more of the granted data classes on one or more of the granted transmission carriers;

wherein multiple transmission grants indicating different data classes are received and one or more of the granted carriers are allocated by the transmitting device according to a predetermined priority ranking of the data classes.

18. A multi-carrier mobile network comprising:
(A) a resource granting device adapted for controlling one or more data transmissions in the multi-carrier mobile network; and
(B) a transmitting device adapted for scheduling the one or more data transmissions;

wherein the resource granting device comprises:
a first microprocessor component adapted to receive a request for transmission resources from the transmitting device; and
a second microprocessor component adapted to provide, in response to the request, transmission grants to the transmitting device, wherein each transmission grant indicates a data rate and a data class granted for a specific transmission carrier, and the one or more transmission grants are provided to the transmitting device for initiating one or more transmissions of data associated with one or more of the granted data classes on one or more of the granted transmission carriers;

wherein the second microprocessor component is adapted to provide multiple transmission grants indicating different data classes to the transmitting device for allocating one or more of the granted carriers according to a predetermined priority ranking of the data classes; and wherein the transmitting device comprises:
a third microprocessor component adapted to request the transmission resources from the resource granting device;
a fourth microprocessor component adapted to receive, in response to the request, the transmission grants from the resource granting device, wherein each transmission grant indicates a data rate and a data class granted for a specific transmission carrier; and a fifth microprocessor component adapted to initiate one or more transmissions of data associated with one or more of the granted data classes on one or more of the granted transmission carriers;
wherein the fourth microprocessor component is adapted to receive multiple transmission grants indicating different data classes and the fifth microprocessor component is adapted to allocate one or more of the granted transmission carriers according to a predetermined priority ranking of the data classes.

19. A multi-carrier mobile network comprising:
(A) a resource granting device adapted for controlling one or more data transmissions in the multi-carrier mobile network; and
(B) a transmitting device adapted for scheduling the one or more data transmissions;

wherein the resource granting device comprises:
a first microprocessor component adapted to receive a request for transmission resources from the transmitting device; and
a second microprocessor component adapted to provide, in response to the request, multiple transmission grants to the transmitting device, wherein each transmission grant indicates a data rate granted for a specific transmission carrier and the multiple transmission grants indicate different data rates, and the multiple transmission grants are provided to the transmitting device for initiating one or more data transmissions on multiple granted transmission carriers in an order of decreasing granted data rates;

wherein the transmitting device comprises:
a third microprocessor component adapted to request transmission resources from the resource granting device;
a fourth microprocessor component adapted to receive, in response to the request, multiple transmission grants from the resource granting device, wherein each transmission grant indicates a data rate granted for a specific transmission carrier and the multiple transmission grants indicate different data rates; and
a fifth microprocessor component adapted to initiate one or more data transmissions on multiple granted transmission carriers selected by the transmitting device in an order of decreasing granted data rates.

* * * * *